(12) United States Patent
Bekemeier et al.

(10) Patent No.: US 10,370,572 B2
(45) Date of Patent: Aug. 6, 2019

(54) MOISTURE-CURABLE HOT MELT SILICONE ADHESIVE COMPOSITIONS INCLUDING AN ALKOXY-FUNCTIONAL SILOXANE REACTIVE RESIN

(71) Applicant: Dow Silicones Corporation, Midland, MI (US)

(72) Inventors: Thomas Bekemeier, Birch Run, MI (US); Adrienne Bowman, Midland, MI (US); Glenn Gordon, Midland, MI (US); Roger Romain, Hemlock, MI (US); James Tonge, Sanford, MI (US); Afrooz Zarisfi, Midland, MI (US)

(73) Assignee: Dow Silicones Corporation, Midland, MI (US)

( * ) Notice: Subject to any disclaimer, the term of this patent is extended or adjusted under 35 U.S.C. 154(b) by 471 days.

(21) Appl. No.: 14/766,773

(22) PCT Filed: Feb. 10, 2014

(86) PCT No.: PCT/US2014/015623
§ 371 (c)(1),
(2) Date: Aug. 10, 2015

(87) PCT Pub. No.: WO2014/124389
PCT Pub. Date: Aug. 14, 2014

(65) Prior Publication Data
US 2015/0376482 A1    Dec. 31, 2015

Related U.S. Application Data

(60) Provisional application No. 61/763,137, filed on Feb. 11, 2013.

(51) Int. Cl.
| | | |
|---|---|---|
| *C09J 183/06* | (2006.01) |
| *C08G 77/18* | (2006.01) |
| *C09J 183/04* | (2006.01) |
| *B32B 7/12* | (2006.01) |
| *B32B 37/12* | (2006.01) |
| *C08K 5/5419* | (2006.01) |
| *C08K 5/57* | (2006.01) |
| *C08L 83/00* | (2006.01) |
| *C08G 77/12* | (2006.01) |
| *C08G 77/20* | (2006.01) |
| *C08G 77/00* | (2006.01) |

(52) U.S. Cl.
CPC .............. *C09J 183/06* (2013.01); *B32B 7/12* (2013.01); *B32B 37/12* (2013.01); *C08G 77/18* (2013.01); *C08K 5/5419* (2013.01); *C08K 5/57* (2013.01); *C08L 83/00* (2013.01); *C09J 183/04* (2013.01); *C08G 77/12* (2013.01); *C08G 77/20* (2013.01); *C08G 77/70* (2013.01); *C09J 2483/003* (2013.01)

(58) Field of Classification Search
None
See application file for complete search history.

(56) References Cited

U.S. PATENT DOCUMENTS

| | | |
|---|---|---|
| 2,676,182 A | 4/1954 | Daudt et al. |
| 3,159,601 A | 12/1964 | Ashby |
| 3,220,972 A | 11/1965 | Lamoreaux |
| 3,296,291 A | 1/1967 | Chalk et al. |
| 3,337,510 A | 8/1967 | Klebe |
| 3,419,593 A | 12/1968 | Willing |
| 3,516,946 A | 6/1970 | Modic |
| 3,714,109 A | 1/1973 | Matherly et al. |
| 3,814,730 A | 6/1974 | Karstedt |
| 3,989,668 A | 11/1976 | Lee et al. |
| 4,087,585 A | 5/1978 | Schults |
| 4,143,088 A | 3/1979 | Farve et al. |
| 4,279,717 A | 7/1981 | Eckberg et al. |
| 4,322,844 A | 3/1982 | Fellinger et al. |
| 4,348,454 A | 9/1982 | Eckberg |

(Continued)

FOREIGN PATENT DOCUMENTS

| | | |
|---|---|---|
| EP | 0347895B A2 | 12/1989 |
| GB | 1101167 | 1/1968 |
| JP | 201184600 | 4/2001 |
| WO | 1998040425 A1 | 9/1998 |
| WO | 2004013403 | 2/2004 |
| WO | 2004037941 A2 | 5/2004 |
| WO | 2008133227 | 11/2008 |
| WO | 2008133228 | 11/2008 |
| WO | 2011056832 A1 | 5/2011 |
| WO | 2014124362 A1 | 8/2014 |

(Continued)

OTHER PUBLICATIONS

Accession No. 2004_371026 SciFinder (2004).*

(Continued)

*Primary Examiner* — Kenneth J Stachel
(74) *Attorney, Agent, or Firm* — Warner Norcross & Judd LLP

(57) ABSTRACT

A moisture-curable silicone adhesive composition is provided that comprises (A) a reactive resin, (B) a reactive polymer, (C) a moisture cure catalyst, and (D) a crosslinker resin. The reactive resin (A) comprises the reaction product of a reaction of an alkenyl-functional siloxane resin comprising $R_3SiO_{1/2}$ units and $SiO_{4/2}$ units and an alkoxysilane-functional organosiloxane compound having at least one silicon-bonded hydrogen atom in the presence of a hydrosilylation catalyst. The reactive polymer (B) comprises the reaction product of a reaction of an alkoxysilane-functional organosiloxane compound having at least one silicon-bonded hydrogen atom and a polyorganosiloxane having an average, per molecule, of at least 2 aliphatically unsaturated organic groups in the presence of a hydrosilylation catalyst.

13 Claims, No Drawings

(56) References Cited

U.S. PATENT DOCUMENTS

| | | | |
|---|---|---|---|
| 4,611,042 | A | 9/1986 | Rivers-Farrell et al. |
| 4,681,963 | A | 7/1987 | Lewis |
| 4,705,765 | A | 11/1987 | Lewis |
| 4,726,964 | A | 2/1988 | Isobe et al. |
| 4,737,562 | A | 4/1988 | Chaudhury et al. |
| 4,742,103 | A | 5/1988 | Morita et al. |
| 4,753,977 | A | 6/1988 | Merrill |
| 4,766,176 | A | 8/1988 | Lee et al. |
| 4,766,183 | A | 8/1988 | Rizk et al. |
| 4,774,310 | A | 9/1988 | Butler |
| 4,784,879 | A | 11/1988 | Lee et al. |
| 4,962,076 | A | 10/1990 | Chu et al. |
| 4,987,158 | A | 1/1991 | Eckberg |
| 5,017,654 | A | 5/1991 | Togahi et al. |
| 5,034,491 | A | 7/1991 | Wewers et al. |
| 5,036,117 | A | 7/1991 | Chung et al. |
| 5,051,455 | A | 9/1991 | Chu et al. |
| 5,053,422 | A | 10/1991 | Pinza et al. |
| 5,053,442 | A | 10/1991 | Chu et al. |
| 5,057,476 | A | 10/1991 | Saruyama et al. |
| 5,075,038 | A | 12/1991 | Cole et al. |
| 5,175,325 | A | 12/1992 | Brown et al. |
| 5,194,649 | A | 3/1993 | Okawa |
| 5,198,476 | A | 3/1993 | Kobayashi et al. |
| 5,200,543 | A | 4/1993 | Inomata et al. |
| 5,248,715 | A | 9/1993 | Gray et al. |
| 5,254,645 | A | 10/1993 | King et al. |
| 5,298,589 | A | 3/1994 | Buese et al. |
| 5,364,921 | A | 11/1994 | Gray et al. |
| 5,389,170 | A * | 2/1995 | Brady .................... C09J 183/04 156/109 |
| 5,397,813 | A | 3/1995 | Eckberg et al. |
| 5,412,055 | A | 5/1995 | Loo |
| 5,459,206 | A | 10/1995 | Somemiya et al. |
| 5,473,026 | A | 12/1995 | Strong et al. |
| 5,525,696 | A | 6/1996 | Herzig et al. |
| 5,536,803 | A | 7/1996 | Fujiki et al. |
| 5,545,831 | A | 8/1996 | Kaiya et al. |
| 5,567,883 | A | 10/1996 | Nara |
| 5,580,925 | A | 12/1996 | Iwahara et al. |
| 5,691,435 | A | 11/1997 | Herzig et al. |
| 5,696,209 | A | 12/1997 | King et al. |
| 5,736,619 | A | 4/1998 | Kane et al. |
| 5,744,507 | A | 4/1998 | Angell et al. |
| 5,869,726 | A | 2/1999 | Dauth et al. |
| 5,985,462 | A | 11/1999 | Herzig et al. |
| 6,013,701 | A | 1/2000 | Kunimatsu et al. |
| 6,030,919 | A | 2/2000 | Lewis |
| 6,093,782 | A | 7/2000 | Herzig et al. |
| 6,127,502 | A | 10/2000 | Krahnke et al. |
| 6,160,150 | A | 12/2000 | Krahnke et al. |
| 6,169,142 | B1 | 1/2001 | Nakano et al. |
| 6,252,100 | B1 | 6/2001 | Herzig |
| 6,297,340 | B1 | 10/2001 | Tachikawa |
| 6,303,729 | B1 | 10/2001 | Sato |
| 6,313,255 | B1 | 11/2001 | Rubinsztajn |
| 6,349,312 | B1 | 2/2002 | Fresko et al. |
| 6,420,504 | B1 | 7/2002 | Yoshitake et al. |
| 6,777,512 | B1 | 7/2004 | Sonnenschein et al. |
| 6,806,330 | B1 | 10/2004 | Sonnenschein et al. |
| 7,026,399 | B2 | 4/2006 | Kim et al. |
| 7,253,307 | B1 | 8/2007 | Carlson, Jr. et al. |
| 7,378,482 | B2 | 5/2008 | Asch et al. |
| 7,429,636 | B2 | 9/2008 | Asch et al. |
| 7,432,338 | B2 | 10/2008 | Chapman et al. |
| 7,440,536 | B2 | 10/2008 | Bruder et al. |
| 7,449,536 | B2 | 11/2008 | Chapman et al. |
| 7,687,585 | B2 | 3/2010 | Karthauser |
| 7,700,712 | B2 | 4/2010 | Zech et al. |
| 7,850,870 | B2 | 12/2010 | Ahn et al. |
| 7,906,605 | B2 | 3/2011 | Cray et al. |
| 7,932,319 | B2 | 4/2011 | Yamamoto et al. |
| 8,110,630 | B2 | 2/2012 | Lin et al. |
| 8,168,737 | B2 | 5/2012 | Alvarez et al. |
| 8,580,073 | B2 | 11/2013 | Behl et al. |
| 8,618,211 | B2 | 12/2013 | Bhagwagar et al. |
| 8,889,261 | B2 | 11/2014 | Carbary et al. |
| 9,045,647 | B2 | 6/2015 | Kleyer et al. |
| 2002/0061998 | A1 | 5/2002 | Cray et al. |
| 2003/0171487 | A1 | 9/2003 | Ellsworth et al. |
| 2007/0212314 | A1 * | 9/2007 | Murphy .................. A61F 13/02 424/66 |
| 2007/0289495 | A1 | 12/2007 | Cray et al. |
| 2009/0075009 | A1 * | 3/2009 | Fujisawa ................ C08L 83/04 428/41.8 |
| 2010/0092690 | A1 | 4/2010 | Alvarez et al. |
| 2010/0183525 | A1 | 7/2010 | Lin |
| 2012/0245272 | A1 | 9/2012 | Dent et al. |
| 2015/0361320 | A1 | 12/2015 | Tang et al. |

FOREIGN PATENT DOCUMENTS

| | | |
|---|---|---|
| WO | 2014124364 A1 | 8/2014 |
| WO | 2014124367 A1 | 8/2014 |
| WO | 2014124378 A1 | 8/2014 |
| WO | 2014124382 A1 | 8/2014 |
| WO | 2014124388 A1 | 8/2014 |

OTHER PUBLICATIONS

Freeman (Silicones, Published for the Plastics Institute, ILIFFE Books Ltd., 1962, p. 27).

JP201184600A, published Apr. 28, 2011, machine translation.

PCT/US2014/015623 ISR Dated May 23, 2014.

* cited by examiner

MOISTURE-CURABLE HOT MELT SILICONE ADHESIVE COMPOSITIONS INCLUDING AN ALKOXY-FUNCTIONAL SILOXANE REACTIVE RESIN

CROSS REFERENCE TO RELATED APPLICATIONS

This application is a U.S. national stage filing under 35 U.S.C. § 371 of PCT Application No. PCT/US14/15623 filed on 10 Feb. 2014, currently pending, which claims the benefit of U.S. Provisional Patent Application No. 61/763137 filed 11 Feb. 2013 under 35 U.S.C. § 119 (e). PCT Application No. PCT/US14/15623 and U.S. Provisional Patent Application No. 61/763137 are hereby incorporated by reference.

The present invention relates generally to hot melt silicone adhesive compositions, and more specifically to moisture-curable hot melt silicone adhesive compositions including an alkoxy-functional siloxane reactive resin.

In U.S. Pat. No. 5,473,026 to Strong et al., it was found that the strength properties and adhesive strength of moisture-curable adhesive compositions at elevated temperatures can be improved by the use of an alkoxy/hydroxyl functional MQ resin wherein some or all of the hydroxyl groups on the MQ resin have been replaced with alkoxy-functionality. However, in these systems the lack of reactivity between the polymer and resin results in high degrees of creep (elongation under static load) which is undesirable for structural adhesives. The lack of crosslinking between the resin and polymer matrix in hot melt adhesives also results in the resin being extractable with solvents or fuel. This is particularly problematic in automotive application where fuel splash can result in resin removal and a subsequent reduction in physical properties. Contact of non-bound resin in hot melt adhesives with other silicone adhesive, conformal coatings, or gels can result in the migration of the resin, resulting in physical changes in both media.

It is therefore highly desirable to have a reactive resin within a hot melt adhesive. The viscous flow of the non-reactive resin based hot melt adhesives excludes them from use in structural adhesives. It would be therefore highly desirable to have a soluble reactive resin based hot melt with higher yield stresses like an alkoxy polymer/filler based structural adhesive, but with the storage and fabrication speed advantages of a hot melt.

BRIEF SUMMARY OF THE INVENTION

The present invention therefore relates to a moisture-curable hot melt silicone adhesive composition comprising (A) a reactive resin, (B) a reactive polymer, (C) a moisture cure catalyst and (D) a crosslinker.

The reactive resin (A) comprises the reaction product of a reaction of an alkenyl-functional siloxane resin comprising $R_3SiO_{1/2}$ units and $SiO_{4/2}$ units, wherein each R is independently a monovalent hydrocarbon radical having 1 to 6 carbon atoms with the proviso that at least one R is an alkenyl radical, wherein the molar ratio of the $R_3SiO_{1/2}$ units to $SiO_{4/2}$ units has a value of from 0.5/1 to 1.5/1; and an alkoxysilane-functional organosiloxane compound having at least one silicon-bonded hydrogen atom in the presence of a (iv) hydrosilylation catalyst.

The reactive polymer (B) comprises the reaction product of a reaction of an alkoxysilane-functional organosiloxane compound having at least one silicon-bonded hydrogen atom and a polyorganosiloxane having an average, per molecule, of at least 2 aliphatically unsaturated organic groups in the presence of a hydrosilylation catalyst.

The moisture-curable hot melt silicone adhesive compositions of the instant invention are non-slump solids under ambient conditions but can be heated to a flowable liquid state and applied as such to substrates by methods employed to dispense hot melt organic adhesives. Further, the compositions of the instant invention can be stored as one part systems for extended periods and cure to essentially non-tacky elastomers when exposed to moisture providing an even stronger bond than its corresponding green strength value.

In addition, moisture-curable hot melt silicone adhesive compositions of the instant invention show improved creep resistance due to increased reactivity between the reactive resin (A) and the reactive polymer (B). Also, because both the reactive resin (A) and the reactive polymer (B) are reactive with each other, the extraction of the reactive resin (A) and/or the reactive polymer (B) after cure is minimized or eliminated.

DETAILED DESCRIPTION OF THE INVENTION

The articles 'a', 'an', and 'the' each refer to one or more, unless otherwise indicated. All amounts, ratios, and percentages in this application are by weight, unless otherwise indicated. All kinematic viscosities were measured at 25° C., unless otherwise indicated.

The present invention is directed to moisture-curable hot melt silicone adhesive compositions that comprise (A) a reactive resin, (B) a reactive polymer, (C) a moisture cure catalyst and (D) a crosslinker. The present invention is also directed at associated methods for forming the adhesive compositions, and to methods for utilizing these adhesive compositions as will be described further below.

In certain embodiments, the moisture-curable hot melt silicone adhesive composition comprises:
(A) a reactive resin comprising the reaction product of a reaction of:
  (i) an alkenyl-functional siloxane resin comprising $R_3SiO_{1/2}$ units and $SiO_{4/2}$ units, wherein each R is independently a monovalent hydrocarbon radical having 1 to 6 carbon atoms with the proviso that at least one R is an alkenyl radical,
  wherein the molar ratio of the $R_3SiO_{1/2}$ units to $SiO_{4/2}$ units has a value of from 0.5/1 to 1.5/1,
  (ii) an alkoxysilane-functional organosiloxane compound having at least one silicon-bonded hydrogen atom, and
  optionally (iii) an endcapper and optionally (iv) an alkenyltrialkoxysilane,
  in the presence of a (v) hydrosilylation catalyst,
(B) a reactive polymer comprising the reaction product of a reaction of:
  (vi) an alkoxysilane-functional organosiloxane compound having at least one silicon-bonded hydrogen atom; and
  (vii) a polyorganosiloxane having an average, per molecule, of at least 2 aliphatically unsaturated organic groups,
  optionally (viii) an alkenyltrialkoxysilane,
  in the presence of (ix) a hydrosilylation catalyst;
(C) a moisture cure catalyst; and
(D) a crosslinker.

As noted above, the reactive resin (A) is formed as the reaction product of a reaction of (i) an alkenyl-functional siloxane resin, (ii) an alkoxysilane-functional organosiloxane compound having at least one silicon-bonded hydrogen atom, and optionally (iii) an endcapper and (iv) vinyltrimethoxysilane in the presence of (iv) a hydrosilylation catalyst.

In certain embodiments, the reactive resin (A) has a weight average molecular weight $M_w$ ranging from 12,000 to 30,000 g/mole (Daltons), alternatively from 17,000 and 22,000 g/mole. In addition, it is preferable that the hydroxyl content of the reactive resin (A) is less than 1 weight percent of the total weight of reactive resin (A). The term "hydoroxyl content", as defined herein, refers to the weight percent of hydroxyl groups in the particular molecule in which they are included, and here defined as the total weight percent of hydroxyl groups in the reactive resin (A) (i.e., the weight percent of OH groups in the reactive resin (A)).

Component (i) of the reactive resin (A) is an alkenyl-functional siloxane resin comprising $R_3SiO_{1/2}$ units and $SiO_{4/2}$ units (i.e., M and Q Units). At least one third, and more preferably substantially all R radicals, are methyl radicals, with the proviso that at least one R radical is an alkenyl radical, and further with the proviso that the resin (i) ranges from 0.6 to 2.2 weight percent, alternatively from 1.0 to 2.0 weight percent, alkenyl-functionality, based on the total weight of the resin (i). Stated differently, the alkenyl radical content of the resin (i) ranges from 0.6 to 2.2 weight percent, alternatively from 1.0 to 2.02 weight percent, of the total weight of the resin (i). Also, the component (i) has a silanol content of less than 1.0 weight percent, alternatively 0.3 to 0.8 weight percent, based on the total weight of the reactive resin (A). Examples of preferred $R_3SiO_{1/2}$ units having methyl radicals include $Me_3SiO_{1/2}$ units and $PhMe_2SiO_{1/2}$ units, wherein Me is methyl and Ph is phenyl. The term "silanol content", as defined herein, refers to the weight percent of silicon-hydroxy groups in the particular molecule in which they are included, and here defined as the total weight percent of silicon-hydroxy groups in the component (i) (i.e., the weight percent of Si—OH groups in the resin).

For the purposes of the present invention, the molar ratio of $R_3SiO_{1/2}$ units to $SiO_{4/2}$ units in resin (i) ranges from 0.5:1 to 1.5:1. Alternatively, the molar ratio of the total M units to total Q units of the resin (i) is between 0.6:1 and 1.0:1. The above M/Q molar ratios can be easily obtained by $^{29}Si$ nuclear magnetic resonance (NMR) spectroscopy.

In addition, the resin (i) has a weight average molecular weight Mw ranging from 12,000 to 30,000 g/mole (Daltons), alternatively from 17,000 and 22,000 g/mole.

In certain embodiments, the resin (i) comprises from 82 to 99 weight percent, alternatively from 85 to 98 weight percent, of the total weight of the reactive resin (A).

Component (ii) of component (A) is an alkoxysilane-functional organosiloxane compound having at least one silicon-bonded hydrogen atom at a molecular terminal. In certain embodiments, the resin (ii) is of the general formula $HSi(R^2)_2OSi(R^2)_2CH_2CH_2Si\ R^2_z(OR)_{3-z}$, wherein $R^2$ is a monovalent hydrocarbon having 1 to 6 carbon atoms and wherein the subscript z is 0 or 1. Even more preferably, the alkoxysilane-functional organosiloxane compound having at least one silicon-bonded hydrogen atom at a molecular terminal (ii) is of the general formula $HSi(Me)_2OSi(Me)_2CH_2CH_2Si(OMe)_3$, wherein Me is methyl.

In certain embodiments, the compound (ii) comprises from 1 to 8 weight percent, alternatively from 2 to 7 weight percent, of the total weight of the reactive resin (A).

In certain embodiments, the reactive resin (A) includes, as part of its reaction product, an endcapper (iii). The endcapper (iii) may be a polydiorganosiloxane having one silicon-bonded hydrogen atom per molecule. An exemplary endcapper may have the formula (I), formula (II), or a combination thereof. Formula (I) is $R^3_3SiO—(R^3_2SiO)_s—SiR^3_2H$. Each $R^3$ is independently a monovalent hydrocarbon group exemplified by alkyl such as methyl, ethyl, propyl, butyl, pentyl, and hexyl; and aryl such as phenyl, tolyl, xylyl and benzyl; and subscript s has a value ranging from 0 to 10, alternatively 1 to 10, and alternatively 1. Formula (II) is $R^4_3SiO—(R^4_2SiO)_t—(HR^4SiO)—SiR^4_3$. In this formula, each $R^4$ is independently a monovalent hydrocarbon group exemplified by alkyl such as methyl, ethyl, propyl, butyl, pentyl, and hexyl; and aryl such as phenyl, tolyl, xylyl and benzyl. Subscript t has a value ranging from 0 to 10, alternatively 0.

In certain embodiments, the endcapper (iii) comprises up to 9 weight percent, alternatively up to 8 weight percent, of the total weight of the reactive resin (A).

In certain embodiments, the reactive resin (A) includes, as part of its reaction product, (iv) a alkenyltrialkoxysilane according to the formula $AlkSi(OR^5)_3$, wherein each $R^5$ is independently a monovalent hydrocarbon having 1 to 6 carbon atoms, wherein Alk represents an alkenyl group having 2 to 6 carbon atoms, and wherein the alkenyl group is at the molecular terminal. One exemplary alkenyltrialkoxysilane is DOW CORNING® Z-6300, a vinyltrimethoxysilane available from Dow Corning Corporation of Midland, Mich. Other exemplary alkenyltrialkoxysilanes (iv) include allyltrimethoxysilane and hexenyltrimethoxysilane.

In certain embodiments, the alkenyltrialkoxysilane (iv) comprises up to 1 weight percent, alternatively from 0.05 to 0.3 weight percent, of the total weight of the reactive resin (A).

The weight percent of silicon bonded hydrogen atoms in the components/unsaturated organic groups capable of undergoing hydrosilylation in the components (commonly referred to as $SiH_{tot}/Vi_{tot}$ ratio) of the reactive resin (A) may range from 0.1 to 1.0. In this ratio, $SiH_{tot}$ refers to the total amount of silicon bonded hydrogen atoms in component (ii) in combination with the amount of silicon bonded hydrogen atoms in component (iii), if present. $Vi_{tot}$ refers to the total amount of aliphatically unsaturated organic groups in component (i) in combination with the amount of aliphatically unsaturated organic groups in component (iv), if present.

Component (v) of the reactive resin (A) is a hydrosilylation catalyst which accelerates the reaction of components (i)-(ii), as well as optional components (iii) and (iv), if present. Component (v) may be added in an amount sufficient to promote the reaction of components (i)-(ii), as well as optional components (iii) and (iv), if present, and this amount may be, for example, sufficient to provide 0.1 parts per million (ppm) to 1000 ppm of platinum group metal, alternatively 1 ppm to 500 ppm, alternatively 2 ppm to 200, alternatively 5 ppm to 20 ppm, based on the combined weight of components (i)-(ii) and optionally (iii) and (iv) used in the process. Alternatively, component (v) from 0.05 to 0.3 weight percent, alternatively from 0.05 to 0.15 weight percent, of the total weight of the reactive resin (A).

Suitable hydrosilylation catalysts are known in the art and commercially available. Component (v) may comprise a platinum group metal selected from platinum (Pt), rhodium, ruthenium, palladium, osmium or iridium metal or organometallic compound thereof, or a combination thereof. Component (v) is exemplified by compounds such as chloroplatinic acid, chloroplatinic acid hexahydrate, platinum dichloride, and complexes of the compounds with low molecular weight organopolysiloxanes or platinum compounds microencapsulated in a matrix or coreshell type structure. Complexes of platinum with low molecular weight organopolysiloxanes include 1,3-diethenyl-1,1,3,3-tetramethyldisiloxane complexes with platinum. Alternatively, the catalyst may comprise 1,3-diethenyl-1,1,3,3-tetramethyldisiloxane complex with platinum. When the catalyst is a platinum complex with a low molecular weight organopolysiloxane, the amount of catalyst may range from 0.04 to 0.4% based on the combined weight of the components used in the process.

Suitable hydrosilylation catalysts for component) are described in, for example, U.S. Pat. Nos. 3,159,601; 3,220,972; 3,296,291; 3,419,593; 3,516,946; 3,814,730; 3,989,668; 4,784,879; 5,036,117; and 5,175,325 and EP 0 347 895 B.

The reactive resin (A) may be formed by a variety of methods that are depend upon whether the endcapper (iii) and alkenyltrialkoxysilane (iv) are included.

In one embodiment, wherein the endcapper (iii) is not present, the reactive resin (A) may be formed by mixing components (i) and (ii) in a reaction vessel at room temperature to achieve homogeneity, and adding component (iv) to this homogeneous mixture and mixing until the resultant mixture is homogeneous. Alternatively, the hydrosilylation catalyst (iv) may be mixed with components (i) and (ii) in the first step.

Next, the resultant mixture by either method is heated to a temperature sufficient to promote the reaction of components (i) and (ii), such as from 60° C. to 120° C., alternatively from 80° C. to 100° C. Samples are taken and the SiH to $SiCH_3$ peaks in the IR (2173/2550 $cm^{-1}$) were compared to the original peak absorbance to assess degree of conversion. Once complete conversion is achieved (i.e., wherein the SiH peaks disappear in the IR), the reactive resin (A) is cooled to room temperature and is available for use.

Next, if desired, the alkenyltrialkoxysilane (iv) is added to the reaction mixture and mixed to homogeneity, wherein the temperature is heated to a temperature sufficient to promote the reaction of components (i) and (ii) and (iv), such as from 60° C. to 120° C., alternatively from 80° C. to 100° C. Samples are taken and the SiH to $SiCH_3$ peaks in the IR (2173/2550 $cm^{-1}$) were compared to the original peak absorbance to assess degree of conversion. Once complete conversion is achieved (i.e., wherein the SiH peaks disappear in the IR), the reactive resin (A) is cooled to room temperature and is available for use.

In an alternative embodiment, wherein the endcapper (iii) is present, the reactive resin (A) may be formed by mixing components (i) and (iii) in a reaction vessel at room temperature to achieve homogeneity, and adding the hydrosilylation catalyst (v) to this homogeneous mixture and mixing until the resultant mixture is homogeneous. Alternatively, the hydrosilylation catalyst (v) may be mixed in the first step.

Next, the resultant mixture by either method is heated to a temperature sufficient to promote the reaction of components (i) and (iii), such as from 60° C. to 120° C., alternatively from 80° C. to 100° C. Samples are taken and the SiH to $SiCH_3$ peaks in the IR (2173/2550 $cm^{-1}$) were compared to the original peak absorbance to assess degree of conversion. Once complete conversion is achieved (i.e., wherein the SiH peaks disappear in the IR), the reactive mixture is cooled to room temperature.

Once at room temperature, component (ii) is added to the mixture and mixed to homogeneity. The resultant mixture by either method is heated to a temperature sufficient to promote the reaction of components (i) and (iii) and (iv), such as from 60° C. to 120° C., alternatively from 80° C. to 100° C. Samples are taken and the SiH to $SiCH_3$ peaks in the IR (2173/2550 $cm^{-1}$) were compared to the original peak absorbance to assess degree of conversion. Once complete conversion is achieved (i.e., wherein the SiH peaks disappear in the IR), the reactive resin (A) is cooled to room temperature and is available for use.

Next, if desired, the alkenyltrialkoxysilane (iv) is added to the reaction mixture and mixed to homogeneity, wherein the temperature is heated to a temperature sufficient to promote the reaction of components (i) and (ii) and (iv), such as from 60° C. to 120° C., alternatively from 80° C. to 100° C. Samples are taken and the SiH to $SiCH_3$ peaks in the IR (2173/2550 $cm^{-1}$) were compared to the original peak absorbance to assess degree of conversion. Once complete conversion is achieved (i.e., wherein the SiH peaks disappear in the IR), the reactive resin (A) is cooled to room temperature and is available for use.

As also noted above, the reactive polymer (B) is formed as the reaction product of a reaction of (vi) an alkoxysilane-functional organosiloxane compound having at least one silicon-bonded hydrogen atom and (vii) an alkenyl-functional polyorganosiloxane containing at least two aliphatically-unsaturated groups and optionally (viii) vinyltrimethoxysilane in the presence of (ix) a hydrosilylation catalyst.

Component (vi) of the reactive polymer (B) is an alkoxysilane-functional organosiloxane compound having at least one silicon-bonded hydrogen atom at a molecular terminal. In certain embodiments, component (vi) is of the general formula $HSi(R^6)_2OSi(R^6)_2CH_2CH_2Si\ R^6_z(OR^6)_{3-z}$, wherein each $R^6$ is independently a monovalent hydrocarbon having 1 to 6 carbon atoms and wherein the subscript z is 0 or 1. Even more preferably, the alkoxysilane-functional organosiloxane compound having at least one silicon-bonded hydrogen atom at a molecular terminal (vi) is of the general formula $HSi(Me)_2OSi(Me)_2CH_2CH_2Si(OMe)_3$, wherein Me is methyl.

In certain embodiments, the alkoxysilane-functional organosiloxane compound (vi) comprises from 0.1 to 4 weight percent, alternatively from 0.25 to 3 weight percent, of the total weight of the reactive polymer (B).

Component (vii) of reactive polymer (B) is a polyorganosiloxane having an average, per molecule, of at least 2 aliphatically unsaturated organic groups, which are capable of undergoing a hydrosilylation reaction with a silicon bonded hydrogen atom of component (vi). Component (vii) may have a linear or branched structure. Alternatively, component (vii) may have a linear structure. Component (vii) may be a combination comprising two or more polyorganosiloxanes that differ in at least one of the following properties: structure, viscosity, degree of polymerization, and sequence.

Component (vii) has a minimum average degree of polymerization (average DP) of 100. Alternatively, average DP of component (vii) may range from 100 to 1000. The distribution DP of polyorganosiloxanes of component (vii) can be bimodal. For example, component (vii) may comprise one alkenyl terminated polydiorganosiloxane with a DP of 60 and another alkenyl terminated polydiorganosiloxane with a DP higher than 100, provided that average DP of the polydiorganosiloxanes ranges from 100 to 1000. However, suitable polyorganosiloxanes for use in component a) have a minimum degree of polymerization (DP) of 10, provided that polyorganosiloxanes with DP less than 10 are combined with polyorganosiloxanes having DP greater than 100. Suitable polydiorganosiloxanes for component a) are known in the art and are commercially available. For example, Dow Corning® SFD-128 has DP ranging from 800 to 1000, Dow Corning® SFD-120 has DP ranging from 600 to 700, DOW CORNING® 7038 has DP of 100, Dow Corning® SFD-119 has DP of 150. All of these are vinyl-terminated polydimethylsiloxanes are commercially available from Dow Corning Corporation of Midland, Mich., USA. When component (vii) has a bimodal distribution, the polyorganosiloxane with the lower DP (low DP polyorganosiloxane) is present in a lower amount than the polyorganosiloxane with the higher DP (high DP polyorganosiloxane). For example, in a bimodal distribution, the ratio of low DP polyorganosiloxane/high DP polyorganosiloxane may range from 10/90 to 25/75.

Component (vii) is exemplified by polyorganosiloxanes of formula (I), formula (II), or a combination thereof. Formula (I) is $R^7{}_2R^8SiO(R^7{}_2SiO)_a(R^7R^8SiO)_bSiR^7{}_2R^8$, and formula (II) is $R^7{}_3SiO(R^7{}_2SiO)_c(R^7R^8SiO)_dSiR^7{}_3$. In these formulae, each $R^7$ is independently a monovalent organic group free of aliphatic unsaturation, each $R^8$ is independently an aliphatically unsaturated organic group, subscript a has an average value ranging from 2 to 1000, subscript b has an average value ranging from 0 to 1000, subscript c has an average value ranging from 0 to 1000, and subscript d has an average value ranging from 4 to 1000. In formulae (I) and (II), $10 \leq (a+b) \leq 1000$ and $10 \leq (c+d) \leq 1000$.

Suitable monovalent organic groups for $R^7$ include, but are not limited to, monovalent hydrocarbon groups exemplified by alkyl such as methyl, ethyl, propyl, butyl, pentyl, octyl, undecyl, and octadecyl; cycloalkyl such as cyclohexyl; and aryl such as phenyl, tolyl, xylyl, benzyl, and 2-phenylethyl. Each $R^8$ is independently an aliphatically unsaturated monovalent organic group. $R^8$ may be an aliphatically unsaturated monovalent hydrocarbon group exemplified by alkenyl groups such as vinyl, allyl, propenyl, and butenyl; and alkynyl groups such as ethynyl and propynyl.

Component (vii) may comprise a polydiorganosiloxane such as i) dimethylvinylsiloxy-terminated polydimethylsiloxane, ii) dimethylvinylsiloxy-terminated poly(dimethylsiloxane/methylvinylsiloxane), iii) dimethylvinylsiloxy-terminated polymethylvinylsiloxane, iv) trimethylsiloxy-terminated poly(dimethylsiloxane/methylvinylsiloxane), v) trimethylsiloxy-terminated polymethylvinylsiloxane, vi) dimethylvinylsiloxy-terminated poly(dimethylsiloxane/methylphenylsiloxane), vii) dimethylvinylsiloxy-terminated poly(dimethylsiloxane/diphenylsiloxane), viii) phenyl, methyl, vinyl-siloxy-terminated polydimethylsiloxane, ix) dimethylhexenylsiloxy-terminated polydimethylsiloxane, x) dimethylhexenylsiloxy-terminated poly(dimethylsiloxane/methylhexenylsiloxane), xi) dimethylhexenylsiloxy-terminated polymethylhexenylsiloxane, xii) trimethylsiloxy-terminated poly(dimethylsiloxane/methylhexenylsiloxane), or xiii) a combination thereof.

In certain embodiments, the polyorganosiloxane having an average, per molecule, of at least 2 aliphatically unsaturated organic groups (vii) comprises from 94.2 to 99.85 weight percent, alternatively from 96.55 to 99.45 weight percent, of the total weight of the reactive polymer (B).

The relative amounts of compound (vi) and the polyorganosiloxane (vii) in the reactive polymer (B) may vary such that the SiH:vinyl weight ratio ranges from 0.8:1 to 1:1.

In certain embodiments, the reactive polymer (B) includes, as part of its reaction product, (viii) a alkenyltrialkoxysilane according to the formula $AlkSi(OR^9)_3$, wherein $R^9$ is a monovalent hydrocarbon having 1 to 6 carbon atoms, wherein Alk represents an alkenyl group having 2 to 6 carbon atoms, and wherein the alkenyl group is at the molecular terminal. One exemplary alkenyltrialkoxysilane is DOW CORNING® Z-6300, a vinyltrimethoxysilane available from Dow Corning Corporation of Midland, Mich. Other exemplary alkenyltrialkoxysilanes (iv) include allyltrimethoxysilane and hexenyltrimethoxysilane.

In certain embodiments, the alkenyltrialkoxysilane (viii) comprises up to 1.5 weight percent, alternatively from 0.05 to 0.3 weight percent, of the total weight of the reactive polymer (B), wherein the SiH:vinyl weight ratio of the reactive polymer (B) remains in the range from 0.8:1 to 1:1.

Component (ix) of the reactive polymer (B) is a hydrosilylation catalyst which accelerates the reaction of components (vi)-(vii) and (viii), if present. Suitable hydrosilylation catalysts (ix) include each of the hydrosilylation catalysts described above fors component (v). Component (ix) may be added in an amount sufficient to promote the reaction of components (vi)-(vii) and (viii), if present, and this amount may be, for example, sufficient to provide 0.1 parts per million (ppm) to 1000 ppm of platinum group metal, alternatively 1 ppm to 500 ppm, alternatively 2 ppm to 200, alternatively 5 ppm to 20 ppm, based on the combined weight of components (v)-(vi) used in the process. Alternatively, component (ix) from 0.05 to 0.3 weight percent, alternatively from 0.05 to 0.15 weight percent, of the total weight of the reactive polymer (B).

To form the reactive polymer (B), in one embodiment, components (vi) and (vii) in a reaction vessel at room temperature to achieve homogeneity, and the hydrosilylation catalyst (ix) is added to this homogeneous mixture and mixing until the resultant mixture is homogeneous. Alternatively, the hydrosilylation catalyst (ix) may be mixed with components (vi) and (vii) in the first step.

Next, the resultant mixture by either method is heated to a temperature sufficient to promote the reaction of components (vi) and (vii), such as from 60° C. to 120° C., alternatively from 80° C. to 100° C. Samples are taken and the SiH to $SiCH_3$ peaks in the IR (2173/2550 $cm^{-1}$) were compared to the original peak absorbance to assess degree of conversion. Once complete conversion is achieved (i.e., wherein the SiH peaks disappear in the IR), the reactive polymer (B) is cooled to room temperature and is available for use.

Next, if desired, the alkenyltrialkoxysilane (viii) is added to the reaction mixture and mixed to homogeneity, wherein the temperature is heated to a temperature sufficient to promote the reaction of components (vi) and (vii) and (ix), such as from 60° C. to 120° C., alternatively from 80° C. to 100° C. Samples are taken and the SiH to $SiCH_3$ peaks in the IR (2173/2550 $cm^{-1}$) were compared to the original peak absorbance to assess degree of conversion. Once complete conversion is achieved (i.e., wherein the SiH peaks disappear in the IR), the reactive polymer (B) is cooled to room temperature and is available for use.

The moisture cure catalyst (C), which is used to accelerate the cure of the instant compositions upon exposure to moisture, may be selected from those compounds known in the art to promote the hydrolysis and subsequent condensation of hydrolyzable groups, in particular alkoxy groups. Suitable curing catalysts include, but are not limited to, metal salts of carboxylic acids, such as dibutyltin dilaurate and dibutyltin diacetate, stannous octanoate, ferrous octanoate, zinc naphthenate, zinc octanoate, lead 2-ethylhexanoate; organotitanium compounds such as tetrabutyl titanate and 2,5-di-isopropoxy-bis(ethylacetate)titanium; and partially chelated derivatives of these salts with chelating agents such as acetoacetic acid esters and beta-diketones.

A sufficient quantity of moisture cure catalyst (C) is added to accelerate the cure of the hot melt adhesive composition.

This amount can readily be determined by the skilled artisan through routine experimentation and is typically about 0.01 to 3 weight percent, alternatively from 0.1 to 1.0 weight percent, based on the combined weight of the resin (A) and polymer (B) solids.

The crosslinker (D) of the present invention is typically a silane represented by monomers of the formula $R^{10}_{4-y}SiX_y$, and oligomeric reaction products thereof; wherein $R^{10}$ is selected from the group consisting of hydrocarbon radicals and substituted hydrocarbon radicals having 1 to 6 carbon atoms. X in the above formula is a hydrolyzable group, preferably selected from alkoxy radicals having 1 to 4 carbon atoms, ketoxime radicals, aminoxy radicals, acetamido, N-methylacetamido or acetoxy radicals and y is 2 to 4, preferably 3 to 4. The ketoxime groups are of the general formula $—ONC(R^{11})_2$, in which each $R^{11}$ independently represents an alkyl radical having 1 to 6 carbon atoms or a phenyl radical.

Specific examples of silanes include, but are not limited to, methyltriethoxysilane, ethyltrimethoxysilane, propyltrimethoxysilane, tetramethoxysilane tetraethoxysilane, phenyltrimethoxysilane, isobutyltrimethoxysilane, and 3-mercaptopropyltrimethoxysilane, (1,6-Bis(trimethoxysilyl)hexane)glycidoxypropyltrimethoxysilane, aminoethylaminopropyltrimethoxysilane, methyltriacetoxysilane, ethyltriacetoxysilane, tetra(methylethyl ketoximo) silane, methyl-tris(methylethylketoximo)silane and vinyl-tris(methylethylketoximo)silane, and others.

Typically the crosslinker (D) is added in amounts ranging from 0.01 to 10 weight percent, alternatively from 0.3 to 5 weight percent, based on the weight of (A) and (B). The silane may be added for several purposes including, but not limited to, to provide stability to the compositions as a moisture scavenger, to aid with network formation, and to act as an adhesion promoter.

Hot melt adhesive compositions of the present invention can be obtained when the weight ratio of reactive resin (A) to reactive polymer (B) ranges from 40:60 to 80:20, alternatively from 50:50 to 70:30, alternatively from 55:45 to 65:35, based on solids. The precise ratio needed to form these systems can be ascertained for a given resin and polymer combination by routine experimentation based on the instant disclosure. When this ratio is below about 40:60, the compositions are fluids which do not exhibit non-slump character; when this ratio is above about 80:20, the compositions exhibit an increased tendency to produce embrittled materials upon cure (i.e., they do not form elastomers).

By "non-slump" it is meant that the material appears to be a solid such that, when a 60 cc jar is filled to about one third capacity with the material and tipped on its side at room temperature (i.e., about 25° C.), essentially no flow is observed within a 20 minute period. This corresponds to a minimum room temperature dynamic viscosity in the approximate range $2 \times 10^7$ to $8 \times 10^7$ mPas when measured at 1 radian/sec. The hot melt compositions of the invention flow at elevated temperatures and can readily be extruded from a conventional hot melt gun (e.g., the dynamic viscosity is of the order $10^4$ mPas at 200° C.).

In addition to components (A)-(D) provided above, in general, small amounts of additional components may be added to the hot melt adhesive compositions of this invention. For example, one or more fillers (E), colorants (F), corrosion inhibitors (G), thermal stabilizers (H), rheological aids (I), and others, may be added as long as they do not materially alter the requirements stipulated herein.

The filler (E) may be added in an amount up to 60 weight percent, alternatively 30 to 55 weight percent, of the total weight of the hot melt adhesive composition. Fillers (E) useful in the instant invention may be exemplified by, but not limited to, inorganic materials such as pyrogenic silica, precipitated silica and diatomaceous silica, ground quartz, aluminum silicates, mixed aluminum and magnesium silicates, zirconium silicate, mica powder, calcium carbonate, glass powder and fibers, titanium oxides of the pyrogenic oxide and rutile type, barium zirconate, barium sulphate, barium metaborate, boron nitride, lithopone, the oxides of iron, zinc, chrome, zirconium, and magnesium, the different forms of alumina (hydrated or anhydrous), graphite, conducting or non-conducting lamp blacks, asbestos, and calcined clay and organic materials such as the phthalocyanines, cork powder, sawdust, synthetic fibers and synthetic polymers (polytetrafluoroethylene, polyethylene, polypropylene, polystyrene and polyvinyl chloride). The filler (E) may be of a single type or mixtures of several types.

Component (F) is a colorant (e.g., dye or pigment). Examples of suitable colorants include carbon black, Stan-Tone 40SP03 Blue (which is commercially available from PolyOne) and Colorant BA 33 Iron Oxide pigment (which is commercially available from Cathay Pigments (USA), Inc. Valparaiso, Ind. 46383 USA). Examples of colorants are known in the art and are disclosed in U.S. Pat. Nos. 4,962,076; 5,051,455; and 5,053,442. The amount of colorant (F) added to the hot melt adhesive composition depends on various factors including the other components of the composition, and the type of colorant selected, however, the amount may range from 0.001% to 20% based on the weight of the hot melt adhesive composition.

Component (G) is a corrosion inhibitor. Examples of suitable corrosion inhibitors include benzotriazole, mercaptabenzotriazole, mercaptobenzothiazole, and commercially available corrosion inhibitors such as 2,5-dimercapto-1,3,4-thiadiazole derivative (CUVAN 826) and alkylthiadiazole (CUVAN® 484) from R. T. Vanderbilt. The amount of component (G) may range from 0.05% to 0.5% based on the weight of the hot melt adhesive composition.

Component (H) is a thermal stabilizer. Suitable thermal stabilizers that may be utilized include Ce, Cu, Zr, Mg, Fe and Zn metal salts. The amount of component (H) may range from 0.001% to 1.0% based on the weight of the hot melt adhesive composition.

Component (I) is a rheological aid that, in certain embodiments, may function to modify the melt viscosity and/or to improve the green strength for the hot melt compositions. Suitable rheological aids include, but are not limited to, plasticizers, nonreactive waxes, reactive waxes, tackifier resins, and combinations thereof.

Suitable examples of component (I) include but are not restricted to one or more of the following, and their derivatives: polyolefins such as polyethylenes, polypropylenes, polybutylenes, and polyisobutylenes; polyvinyl acetate; hydrocarbon resins, hydrogenated aromatic pure monomer hydrocarbon resins, including aromatic pure styrene hydrocarbon resins; asphalts; bitumens; paraffins; crude rubbers; fluorinated rubbers; fluorocarbons; polystyrenes; cellulosic resins; acrylic resins; styrene butadiene resins; polyterpenes; ethylene propylene diene monomer (EPDM); and mixtures and/or derivatives thereof.

Suitable commercial materials that may be utilized include Benzoflex 352, available from Eastman Chemical Co. of Kingsport, Tenn.; Vorasil 602 or 604, each available from Dow Chemical of Midland, Mich.; Licocene® PE SI 3361 TP and Licowax® E, each available from Clariant of Charlotte, N.C.; and Escorez™ 5320, a tackifying resin commercially available from ExxonMobil of Houston, Tex. In certain other embodiments, these commercially available materials may be used alone or in combination with Oppanol® B12, available from BASF Corporation of Florham Park, N.J.

The amount of component (I) may range from 0.1 to 20%, alternatively 0.5 to 10%, alternatively 1 to 2%, based on the weight of the hot melt adhesive composition.

The Hot Melt compositions of the instant invention can be prepared in several ways.

In one exemplary method, the reactive resin (A) and reactive polymer (B) are premade as described above and then premixed in a high shear mixer via a batch or continuous process and fed into an extruder, such as a twin-screw extruder, for removal of solvents via devolatization. In certain embodiments, the extruded mixture is heated to about 140° C.-180° C. during this devolatization. The extruded and devolatized mixture of the reactive resin (A) and reactive polymer (B) is then cooled to less than 95° C., wherein a mixture of the moisture cure catalyst (C) and the crosslinker (D) are added via a batch or continuous process. In addition, any other combination of optional components (E)-(I) may be also be added via a batch or continuous process. The resultant mixture is then extruded to form the hot melt adhesive, which may be stored for subsequent use or available for immediate application to a substrate. In certain embodiments, for example, the hot melt adhesive may be stored and sealed in a 12 oz aluminum Semco tubes (available from PPG Industries, Semco® Packaging and Application Systems, Pittsburgh, Pa. 15272 USA).

In another exemplary method, the reactive polymer (B) is premade as described above and premixed in a high shear mixer via a batch or continuous process with the alkenyl-functional siloxane resin (component (i) of the reactive resin (A)). To this mixture is added components (ii), (iii), (v) and optional component (iv) (i.e., the remainder of the components of the reactive resin (A)). The resultant mixture is fed into an extruder, such as a twin-screw extruder, for removal of solvents via devolatilization. In certain embodiments, the extruded mixture is heated to about 140° C.-180° C. during this devolatization. The extruded and devolatized mixture is then cooled to less than 95° C., wherein a mixture of the moisture cure catalyst (C) and the crosslinker (D) are added via a batch or continuous process. In addition, any other combination of optional components (E)-(I) may be also be added via a batch or continuous process. The resultant mixture is then extruded to form the hot melt adhesive, which may be stored for subsequent use or available for immediate application to a substrate. In certain embodiments, for example, the hot melt adhesive may be stored and sealed in a 12 oz aluminum Semco tubes (available from PPG Industries, Semco® Packaging and Application Systems, Pittsburgh, Pa. 15272 USA).

The hot melt adhesive compositions of the instant invention may be applied to various substrates by techniques currently employed for dispensing organic hot melt formulations (e.g., hot melt gun, extrusion, spreading via heated draw-down bars, or doctor blades). The common factor in these methods is that the composition is heated to a temperature sufficient to induce flow before application. Upon cooling to ambient conditions, the compositions of the present invention are tacky, non-slump adhesive compositions which may be used to bond components or substrates to one another. Alternatively, the bonding can take place while the adhesive is still hot, but the latter will not, of course, support much stress under these conditions. After the desired components are bonded with the hot melt adhesives of the invention, the combination is exposed to ambient air so as to cure the hot melt adhesives to an essentially non-tacky elastomer. Essentially tack-free herein indicates that the surface feels dry or nearly dry to the touch. The time required for completion of this cure process ranges from about a day to more than a month, depending upon the catalyst type, catalyst level, temperature and humidity, inter alia. As a result of this cure, the adhesive strength of the instant compositions is greatly augmented.

The compositions of this invention find utility in many of the same applications as now being served by silicone hot melt adhesives, particularly in such industries as automotive, electronic, construction, space and medical. Exemplary electronics applications include but are not limited to the use of the silicone hot melt adhesives in portable electronic devices such as smart phones, tablets and watches. In these areas of application, the instant hot melt adhesives provide bonds which are resistant to hostile environments, such as heat and moisture.

In addition, moisture-curable hot melt silicone adhesive compositions of the instant invention show improved creep resistance due to increased reactivity between the resin (A) and the polymer (B). Also, because both the resin (A) and polymer (B) are reactive with each other, the extraction of the reactive resin (A) and reactive polymer (B) after cure is minimized or eliminated.

So that those skilled in the art can understand and appreciate the invention taught herein, the following examples are presented, it being understood that these examples should not be used to limit the scope of this invention found in the claims attached hereto. All parts and percentages in the examples are on a weight basis and all measurements were obtained at 25° C., unless indicated to the contrary.

COMPARATIVE EXAMPLES

These examples are intended to illustrate the invention to one of ordinary skill in the art and should not be interpreted as limiting the scope of the invention set forth in the claims. The following components were used in the examples described below.

I. List of Components for Examples:
DOW CORNING® SFD-119; 0.46 wt % vinyl linear polydimethylsiloxane;
DOW CORNING® SFD-117; 0.2 wt % vinyl linear polydimethylsiloxane;
DOW CORNING® SFD-120; 0.13 wt % vinyl linear polydimethylsiloxane;

DOW CORNING® SFD-128; 0.088 wt % vinyl linear polydimethylsiloxane;

DOW CORNING® 2-0707; Platinum catalyst 0.52 wt % Platinum;

Hexamethyldisilazane (DOW CORNING® 4-2839);

Tetramethyldivinyldisilazane (DOW CORNING® Z-2484);

Vinyltrimethoxysilane (VTMS) (DOW CORNING® Z-6300);

(DOW CORNING® XC F3-6105)—Trimethoxysilyl-ethyl-1,1,3,3-tetramethyldisiloxane (ETM);

DOW CORNING® 2-5161 Capper Heptamethyltrisiloxane;

DOW CORNING® OFS-2306 SILANE Isobutyltrimethoxysilane (IBTMS);

Alkoxylated Polymer 1 (AP-1)—DOW CORNING® 3-0116 (Trimethoxysilylethyl)tetramethyldisiloxane-terminated polydimethylsiloxane (DOW CORNING® SFD 128), about 60,000 cps;

Alkoxylated Polymer 2 (AP-2)—(Trimethoxysilylethyl) tetramethyldisiloxane terminated polydimethylsiloxane (DOW CORNING® SFD-120) about 10,000 cps;

Alkoxylated Polymer 3 (AP-3)—DOW CORNING® 3-1717 (Trimethoxysilylethyl)tetramethyldisiloxane terminated polydimethylsiloxane (DOW CORNING® SFD-117), about 2000 cps;

Alkoxylated Polymer 4 (AP-4) DOW CORNING® 3-1719 Trimethoxysilylethyl)tetramethyldisiloxane-terminated polydimethylsiloxane, about 500 cps;

MQ Resin 1—(DOW CORNING® DC407 resin) high silanol $M_w$ 17,000-22000 g/mol, silanol content 3.4 wt %, available from Dow Corning Corporation of Midland, Mich., USA;

MQ Resin 2—(DOW CORNING® 57104) low silanol $M_w$=17,000-22000 g/mol, silanol content 0.8 wt %, available from Dow Corning Corporation of Midland, Mich., USA;

ViMQ Resin 1 high vinyl high silanol MQ (6-3444), vinyl content 1.9 wt %, $M_w$=17,000-22000 g/mol, silanol content 1.5 wt %, available from Dow Corning Corporation of Midland, Mich., USA;

TYZOR TNBT; available from Dorf Ketal Speciality Catalysts, LLC, 3727 Greenbriar Dr., Stafford, Tex. 77477 USA;

Trifluoroacetic acid (TFAA), available from Sigma-Aldrich Corp. St. Louis, Mo., USA;

Trifluoromethanesulfonic acid, triflic acid (FC-24), available from 3M Corporation, St. Paul, Minn. 55144-1000 USA;

Zerogen 50SP, magnesium hydrate, available from Huber;

Micral hydrated Alumina ATH 9400Sp, available from Huber; and

Ti-pire R-960 $TiO_2$, available from Dupont.

II. List of Substrates for Examples:

Alclad™ Aluminum Type AD Q-Panel 2024T3: available from Q-Lab Corporation, 800 Canterbury Rd., Cleveland, Ohio 44145 USA;

III. Equipment Used for Examples:

All blending described below was done with a Pneumatic High Shear Mixer fed with a Pneumatic pail pump and metered with a Zenith 2.92 CC/Rev Gear Pump. Catalyst feed was carried out by an Isco 500D Syringe pump.

All extrusion experiments were performed on a modular 30 mm Co-Rotating, Fully Intermeshing Twin Screw Extruder manufactured by Century. The extruder is powered by a 15 HP AC motor capable of generating screw speeds of up to 500 rpm. The actual diameter of each screw is 30.7 mm and the channel depth is 4.8 mm. The free space cross sectional area is 4.77 cm². The overall length to diameter ratio of the machine is 42:1 L/D (12 barrels) having a total free processing volume of 477 cm³. The screw elements that were utilized consisted of right and left handed conveying screws and kneading blocks.

These examples are intended to illustrate the invention to one of ordinary skill in the art and should not be interpreted as limiting the scope of the invention set forth in the claims. The following components were used in the examples described below.

NMR: Solution-state $^{29}$Si- and $^{13}$C-NMR spectra were recorded on a Mercury VX 400 MHz spectrometer at room temperature (20-22° C.) using $CDCl_3$ (Isotec) in a 16 mm Si-free probe. $Cr(acac)_3$ (Chromium acetylacetonate) (20 mM) was added to NMR samples as a relaxation agent. $^{29}$Si NMR spectra were acquired at 79.493 MHz and processed with 5 Hz of Lorentzian line broadening. The spectra were only semiquantitative due to the long relaxation times of the $^{29}$Si nucleus, but relative comparison of spectra acquired under identical conditions was considered quantitative. $^{13}$C NMR spectra were acquired at 100.626 MHz and processed with 3 Hz of Lorentzian line broadening. For both nuclei, 256-512 scans with a 90° pulse width were typically co-added to achieve adequate sensitivity; a 6-second ($^{29}$Si) or 12-second (13C) delay between pulses was used. Gated decoupling was used to remove negative nuclear Overhauser effects. Chemical shifts were referenced to external tetramethylsilane (TMS).

IV. Preparation of ViMQ Resin 2 and 3

A. Preparation of Low Silanol, High Vinyl Version of Vinyl MQ in LS Resin Polymer Blend (ViMQ Resin 2)

ViMQ Resin 2 was prepared for evaluation by first adding 80 parts of ViMQ Resin 1 (70% solids in xylene; 2 wt % vinyl and 1.8 wt % silanol based on resin solids) and 10 parts of xylene to a resin kettle under a nitrogen blanket, a Dean Stark trap and condenser. 0.02 parts of trifluoroacetic acid was added with stirring followed by the slow addition of 10 parts of hexamethyldisilazane from an addition funnel at room temperature. The mixture was heated to 80° C. for 4 hours, at which point 1 part of isopropanol (IPA) 5 parts of water were added to quench the reactions. The low boiling fractions were removed using the Dean Stark trap and xylene was added to maintain a resin level of about 70 wt %. The resin produced (i.e., ViMQ Resin 2) has a vinyl content of 2% and a silanol level of 0.8 wt % as measured by $^{29}$Si-NMR.

B. Preparation of Low Silanol, Low Vinyl Version of Vinyl MQ in LS Resin Polymer Blend (ViMQ Resin 3)

Using a synthetic method analogous to the method above to produce ViMQ Resin 2, ViMQ Resin 3 was prepared by adding 63.8 parts of an MQ Resin 1 (70 wt % solids in xylene) and 23.8 parts of xylene and 0.01 part of trifluoroacetic acid to a 3 neck round bottom flask under a nitrogen blanket at room temperature. To this mixture slowly add a pre-mix of 3.7 parts of hexamethyldisilazane and 4.3 parts of tetramethyldivinyldisilazane. Upon completion the temperature was increased to 80° C. and held for 4 hours. The flask was cooled to less than 60° C. at which point 0.65 parts of IPA and 3.7 parts of water were added to quench the reactions. The mixture was then heated to reflux to remove volatiles. Analysis of materials by $^{29}$Si NMR, as shown in Table 1, yields:

TABLE 1

$^{29}$Si-NMR
0.458 moles M per mole Si
0.031 moles Mvi per mole Si
0.511 moles Q per mole Si
0.022 moles OH per mole Si
Molecular Weight
Mw = 17700 Daltons C. Alternative Preparation of ViMQ Resin 3 Using Acid Route ViMQ Resin 3 was also prepared by adding 86.7 parts of MQ resin 2 (70 wt % solids in xylene), 5.8 parts of xylene, 6.4 parts of tetramethyldivinyldisiloxane and 0.05 part of triflic acid (FC-24) to a 3 neck round bottom flask under a nitrogen blanket at room temperature. The temperature of the resultant mixture is increased to 72° C. and held for 4 hours. The flask was cooled to less than 60° C. at which point calcium carbonate was added in a 5 mole excess of triflic acid and stirred for 1 hour. The calcium carbonate was filtered and stripped to 60 wt % resin. Analysis of materials by $^{29}$Si-NMR, as shown in Table 1, yields:

TABLE 2

$^{29}$Si-NMR
0.442 moles M per mole Si
0.040 moles Mvi per mole Si
0.518 moles Q per mole Si
0.036 moles OH per mole Si
Molecular Weight
Mw = 17500 Daltons V. Generic Method for Forming Alkoxy Reactive MQ Resin from ViMQ Resin 2 or 3 and Formation of Hot Melt Adhesive from the Formed Alkoxy Reactive MQ Resin To form an alkoxy reactive MQ resin (i.e., reactive resin (A)) from ViMQ Resin 2 or 3, ViMQ Resin 2 or 3 (in xylene) was first added into a 10 kg Turello mixer. Next, ethyltrimethoxysilane (DOW CORNING® XCF3-6105) was added to the mixer and mixed for 10 minutes under a nitrogen atmosphere. Prior to adding Platinum catalyst a sample is taken for IR analysis. A platinum catalyst was added and the sample was heated to 100° C. for a minimum of 60 minutes. Samples were taken and the SiH to SiCH$_3$ peaks in the IR (2173/2550 cm$^{-1}$) were compared to the original peak absorbance to assess degree of conversion.

To form the Hot Melt Adhesive, the alkoxy reactive MQ resin was premixed with alkoxy reactive linear polymer (Alkoxy Polymer Resin 1) in a Pneumatic High Shear Mixer via a batch process and fed into a twin screw extruder for devolatization at 140° C.-180° C., followed by cooling and the addition of a 93/7 blend of isobutyltrimethoxysilane (OFS-2306 SILANE) and titanium condensation catalyst (TYZOR TNBT). Hot melt adhesives were then extruded directly into 12 oz aluminum Semco tubes (available from PPG Industries, Semco Packaging and Application Systems, Pittsburgh, Pa. 15272 USA) and sealed for further analysis.

VI. Evaluation of Specific Hot Melt Adhesive Compositions

Four specific hot melt adhesive formulations (i.e., Hot Melt 1-4, as shown in Table 3) were prepared according to the methodology of Part V at a resin/polymer ratio of 60/40 and evaluated for appearance, temperature profile, viscosity ratio and average percentage cure. The compositions and results are summarized in Tables 3-4 below:

TABLE 3

| Hot Melt Resin Sample # | SiH:Vi Ratio for ETM to Resin | ViMQ Resin 2 (wt %) | Crosslinker OFS-2306 SILANE (wt %) | DOW CORNING® XCF3-6105 (wt %) | DOW CORNING® 2-0707 Platinum Catalyst (wt %) | Alkoxy Polymer 1 (wt %) |
| --- | --- | --- | --- | --- | --- | --- |
| Hot Melt 1 | 0.1 | 59.3 | 1.34 | 1.2 | 0.1 | 39.4 |
| Hot Melt 2 | 0.3 | 57.8 | 1.34 | 3.6 | 0.1 | 38.4 |
| Hot Melt 3 | 0.5 | 56.6 | 1.34 | 5.6 | 0.1 | 37.6 |
| Hot Melt 4 | 0.7 | 55.4 | 1.34 | 7.7 | 0.1 | 36.8 |

TABLE 4

| Hot Melt Resin Sample | Appearance | Temperature Profile | Viscosity Ratio 24 hr 120° C. | Average % Cure |
|---|---|---|---|---|
| Hot Melt 1 | clear | sloped | 1.8 | 56.9 |
| Hot Melt 2 | opaque | flat | 2.3 | 72.6 |
| Hot Melt 3 | opaque/white | flat | 2.2 | 72.5 |
| Hot Melt 4 | opaque/white | flat | 0.9 | 63.5 |

Based upon the results of Table 4, which indicates that the upper limit of the SiH:Vi ratio for ETM to Resin was about 0.3, additional hot melt adhesives using the methodology of Part V at a resin/polymer ratio of 60/40 were also prepared in which the SiH:Vi ratio was varied between 0.3 and 0.1 by increasing the level of ETM from 1.22 to 3.57 weight percent and in which both ViMQ Resin 2 or 3 were evaluated. The resultant compositions were evaluated for swell gel (extraction)—percent cure, viscosity ratio, appearance, and % creep. The results are summarized in Tables 7 and 8 below:

TABLE 5

| Hot Melt Resin Sample | SiH:Vi Ratio for ETM to Resin | ViMQ Resin 2 or 3 (wt %) | DOW CORNING® XCF3-6105 (wt %) | 3-0024 blend of IBTMS/TNBT (wt %) | DOW CORNING® 2-0707 Platinum Catalyst (wt %) | Alkoxy Polymer 1 (wt %) |
|---|---|---|---|---|---|---|
| Hot Melt 5 | 0.30 | 57.02 (Resin 2) | 3.57 | 1.38 | 0.12 | 37.92 |
| Hot Melt 6 | 0.24 | 57.43 (Resin 2) | 2.87 | 1.38 | 0.12 | 38.20 |
| Hot Melt 7 | 0.17 | 57.93 (Resin 2) | 2.05 | 1.38 | 0.12 | 38.52 |
| Hot Melt 8 | 0.10 | 58.43 (Resin 2)) | 1.22 | 1.38 | 0.12 | 38.86 |
| Hot Melt 9 | 0.30 | 57.50 (Resin 3) | 2.66 | 1.38 | 0.12 | 38.34 |
| Hot Melt 10 | 0.42 | 56.88 (Resin 3)) | 3.69 | 1.38 | 0.12 | 37.92 |
| Hot Melt 11 | 0.56 | 58.91 (Resin 3) | 4.98 | 1.38 | 0.12 | 34.60 |
| Hot Melt 12 | 0.56 | 58.47 (Resin 3)) | 4.95 | 1.38 | 0.12 | 35.08 |
| Hot Melt 13 | 0.56 | 59.26 (Resin 3) | 4.42 | 1.38 | 0.12 | 34.81 |
| Hot Melt 14 | 0.71 | 59.11 (Resin 3)) | 4.67 | 1.38 | 0.12 | 34.72 |
| Hot Melt 15 | 0.56 | 59.11 (Resin 3)) | 4.42 | 1.38 | 0.12 | 34.81 |
| Hot Melt 16[1] | 0.17 | 59.11 (Resin 3)) | 2.05 | 1.38 | 0.12 | 38.52 |
| Hot Melt A[2] | N/A | 59.11 (MQ Resin 2[3])) | N/A | 1.2 | N/A | 34.58 |

[1]Hot Melt 16 is a repeat of Hot Melt 7 but done by a continuous process.
[2]Comparative Adhesive - Instaglaze (II) ®, available from Dow Corning Corporation of Midland, Michigan, which is an alkoxylate polymer non-reactive mixture with about 35% swell gel cure value.
[3]MQ Resin 2 is a low silanol, zero vinyl MQ resin.

TABLE 6

| Hot Melt Resin Sample # | Swell Gel (Extraction) - % Cure[4] | Viscosity Ratio (120° C. for 24 hrs) | Appearance | % Creep[5] |
|---|---|---|---|---|
| Hot Melt 5 | 69.1 | Gelled | Hazy | N/A |
| Hot Melt 6 | 66.5 | 2.2 | Clear | N/A |
| Hot Melt 7 | 61.2 | 2.0 | Clear | N/A |
| Hot Melt 8 | 54.4 | 1.6 | Clear | N/A |
| Hot Melt 9 | 67.1 | 3.9 | Hazy | 43 |
| Hot Melt 10 | 57.58 | 2.8 | Hazy | 35 |
| Hot Melt 11 | 68.8 | 2.2 | Clear | 6.8 |
| Hot Melt 12 | 65 | N/A | Clear | 15 |
| Hot Melt 13 | 63.9 | 2.3 | Clear | 4.4 |
| Hot Melt 14 | 66.9 | N/A | Slightly Hazy | 4.3 |
| Hot Melt 15 | 67.9 | N/A | Clear | 2.6 |
| Hot Melt 16[1] | 59.8 | 1.9 | Clear | N/A |
| Hot Melt A[2] | 35 | 1.2 | Clear | 153 |

[4]Equilibrium Swelling (CTM 1345)(RAN) % Cure—The gel fraction of an adhesive cured for a specific time interval was determined by equilibrium solvent swelling in toluene according to CTM 1345.
[5]% Creep measured in accordance with Dow Corning corporate test method (CTM 1409), which is based on ASTM C-961 "Standard Test Method for Lap Shear Strength of Sealants," and ASTM D-3535 "Standard Test Method for Resistance to Creep Under Static Loading for Structural Wood Laminating Adhesives Used Under Exterior Exposure Conditions."

As Tables 3-6 illustrate, when the alkoxy functionality on the reactive resin (A) in the reactive polymer (B) is reduced, the solubility of the reactive resin (A) in the reactive polymer (B) is increased and at the same time the degree of cure is increased as the reactive resin (A) and the reactive polymer (B) co-cure to a single matrix, and not two heterogeneous phases. If too low of a conversion of vinyl to resin occurs the resin is soluble in polymer but there is insufficient functionality to create a single cured system and the reactive resin (A) can be extracted, in which the average percentage cure may drop to about 40%, In these systems the lack of reactivity between the reactive polymer (B) and the reactive resin (A) results in high degrees of creep (elongation under static load) which is undesirable for structural adhesives.

VI. Evaluation of Hot Melt Adhesives With and Without Endcapper 8722 grams of ViMQ Resin 2 (65.4% solids, 2.04 wt % vinyl) in xylene was loaded into a 10 kg Turello mixer. To this was added 479.8 g of DOW CORNING® 2-5161 Capper Heptamethyltrisiloxane. The resultant mixture was allowed to mix for 10 minutes under a nitrogen blanket. A sample was taken for IR analysis. 12 g of DOW CORNING® 2-0707 platinum catalyst was added to the sample, and the sample was heated to 100° C. for a minimum of 60 minutes. Samples were taken and the SiH to $SiCH_3$ peaks in the IR (2173/2550 $cm^{-1}$) were compared to the original peak absorbance to assess degree of conversion. The resultant mixture was cooled less than 30° C., and 365.93 g of DOW CORNING® XCF3-6105 (ethyltrimethoxysilane converter) was added. The resultant mixture was then mixed for 10 minutes under a nitrogen blanket, wherein the temperature was increased to 100° C. and the extent of reaction monitored by loss of SiH signal in FT-IR spectroscopy.

This procedure was repeated with the omission of the DOW CORNING® 2-5161 Capper Heptamethyltrisiloxane to give a control. The ViMQ resin was then converted to hot melt adhesive at a resin to polymer ratio of 60:40 using the methodology of Part V above. Viscosity changes and the relative weight percents of the endcapper (Capper) and ETM are provided in Table 7:

TABLE 7

| | Viscosity Change (X) | | Average | | | |
|---|---|---|---|---|---|---|
| | 24 h/120° C. | 4 wk/50° C. | % Cure | R/P | Capper | ETM |
| Capper/ ETM | 1.1 | 2.0 | 73.5 | 60/40 | 0.5 | 0.3 |
| ETM | 2.1 | 11.4 | 72.2 | 60/40 | 0 | 0.3 |

The aging data for a resin in which 50% of the available ViMQ Resin 2 has been converted by capper, compared to 30% ETM converted shows little viscosity change after aging 24 hours at 120° C. compared to the acceptable control. A goal of about only doubling (2) is commercially viable.

Without wishing to be bound by theory it is believed the initial capping of vinyl on the ViMQ resin 2 improved the solubility of the final alkoxylated MQ resin in the hot melt adhesive composition and gave a more even distribution of the ETM converter reaction with the resin and hence improved viscous stability.

VII. Evaluation of Hot Melt Adhesives With Varying Vinyl Contents in Linear Polydimethylsiloxane Resin at 55:45 Resin to Polymer Ratio In a further extension of this technology balancing the fraction of alkoxy groups available for reaction on the resin and the polymer in the hot melt leads to improved cure capabilities.

In these examples, the alkoxylated ViMQ resin 2 was premixed with either Alkoxy Polymer 1 or 2 (AP-1 or AP-2) at a 55/45 weight ratio with the addition of magnesium hydrate (Zerogen 50SP) at 10 wt % with respect to alkoxylated resin polymer blend. This solvent/resin/polymer/filler combination was processed via the method of Part V above, wherein the filler was added after the devolatization step but prior to the second extrusion step. Viscosity changes and the relative weight percents of the components are provided in Table 8:

TABLE 8

| ViMQ Resin 2 premixed with: | Resin/ Polymer Ratio | Zerogen 50SP | SiH:Vi for ETM to Resin | Upturn | Viscosity Change (X) 24 h/120° C. | Average % Cure |
|---|---|---|---|---|---|---|
| AP-1 | 55/45 | 10% | 0.30 | Y | 3.0 | 79.3 |
| AP-2 | 55/45 | 10% | 0.30 | N | 1.9 | 78.3 |

As Table 8 illustrates, a small increase in the vinyl content of the alkoxy polymer (DOW CORNING® SFD-120, utilized in AP-1 vs. and having 0.13 wt % vinyl linear polydimethylsiloxane vs. DOW CORNING® SFD-128 used in AP-2 and having 0.088 wt % vinyl linear polydimethylsiloxane) utilized in the hot melt formulation results in an increase in the viscosity change in 24 hours at 120 degrees Celsius and a slight increase in average percent cure.

VIII. Evaluation of Flame Retardance in Hot Melt Adhesives

ViMQ resin 3 (NVC=65.0%; 1.44 wt % vinyl) in xylene was loaded into a 10 kg Turello mixer. Next, ethyltrimethoxysilane (DOW CORNING® XCF3-6105) was added which was allowed to mix for 10 minutes under a nitrogen atmosphere. A sample was taken for IR analysis. 12 g of DOW CORNING® 2-0707 platinum catalyst was added to the sample, and the sample was heated to 100° C. for a minimum of 60 minutes. Samples were taken and the SiH to $SiCH_3$ peaks in the IR (2173/2550 cm-1) were compared to the original peak absorbance to assess degree of conversion.

The samples in Table 9 were cooled and a flame retardant filler and alkoxy polymer 1 (AP1) was added. The materials were mixed then pumped through the twin screw extruder as described in Part V above with the addition of 1.38 wt % mixture of IBTMS and TYZOR TNBT and the resultant mixture was placed into a Semco® tube.

The Semco® tube of hot melt adhesive was placed in a hot melt gun at 120° C. Material was extruded into a metal chase of 3 or 6 mm depth. The material was sandwiched between Teflon sheets and formed in a hot press at 120° C. and 20 tons of pressure. After cooling to room temperature, the top Teflon sheet was further cooled with liquid nitrogen to aid removal. The hot melt adhesive was allowed to cure for 28 days followed by 1 hour in a vacuum oven prior to cutting samples for vertical burn testing. The vertical burn test performed was based on Underwriters Laboratory Testing Method UL 94. A UL-94 rating of V-0 is indicative that burning stops within 10 seconds on a vertical specimen; drips of particles allowed as long as they are not inflamed. A UL-94 rating of V1 is indicative that burning stops within 30 seconds on a vertical specimen; drips of particles allowed as long as they are not inflamed.

TABLE 9

|  | Hot Melt 19 | Hot Melt 20 | Hot Melt 21 | Hot Melt 22 | Hot Melt 23 | Hot Melt 24 | Hot Melt 25 |
|---|---|---|---|---|---|---|---|
| Vi MQ resin 3 (1.44 wt % Vi) | 40.43 | 34.65 | 28.88 | 28.88 | 28.87 | 28.87 | 28.87 |
| ETM (DOW CORNING ®XCF-36105) | 2.61 | 2.23 | 1.86 | 1.86 | 1.87 | 1.87 | 1.87 |
| Platinum (DOW CORNING ®2-0707) | 0.08 | 0.07 | 0.06 | 0.06 | 0.06 | 0.06 | 0.06 |
| AP-1 | 26.88 | 23.04 | 19.20 | 19.20 | 19.20 | 19.20 | 19.20 |
| Zerogen 50SP | 30.00 | 40.00 | 40 |  | 50 |  |  |
| ATH Hymod 9400SP |  |  |  | 40 |  | 50 | 50 |
| Ti-pure R-960 |  |  | 10 | 10 |  | 5.00 | 5.00 |
| Vertical Burn Rating |  |  |  |  |  |  |  |
| 3 mm | V1 | V-0 | V1 | N/a | V-0 | V-0 | V-0 |
| 6 mm | V-0 | V-0 | V-0 | V-0 | V-0 | V-0 | V-0 |

The instant disclosure has been described in an illustrative manner, and it is to be understood that the terminology which has been used is intended to be in the nature of words of description rather than of limitation. Obviously, many modifications and variations of the instant disclosure are possible in light of the above teachings. It is, therefore, to be understood that within the scope of the appended claims, the instant disclosure may be practiced otherwise than as specifically described.

The invention claimed is:

1. A moisture-curable hot melt silicone adhesive composition comprising:
(A) a reactive resin comprising a hydrosilylation reaction product of a reaction of:
an alkenyl-functional siloxane resin comprising $R_3SiO_{1/2}$ units and $SiO_{4/2}$ units, wherein each R is independently a monovalent hydrocarbon radical having 1 to 6 carbon atoms with the proviso that at least one R is an alkenyl radical, wherein the molar ratio of the $R_3SiO_{1/2}$ units to $SiO_{4/2}$ units has a value of from 0.5/1 to 1.5/1,
a first alkoxysilane-functional organosiloxane compound of a formula $HSi(R^2)_2OSi(R^2)_2CH_2CH_2SiR^2_z(OR^2)_{3-z}$, wherein each $R^2$ is independently a monovalent hydrocarbon having 1 to 6 carbon atoms and wherein the subscript z is 0 or 11, and
in the presence of a first hydrosilylation catalyst;
(B) a reactive polymer comprising a (trimethoxysilylethyl)tetramethyldisiloxane-terminated polydimethylsiloxane having a viscosity of from 500 to 60,000 cps;
(C) a catalyst; and
(D) a crosslinker.

2. The composition according to claim 1, wherein a weight average molecular weight $M_w$ of the reactive resin (A) is from 12,000 to 30,000 g/mole.

3. The composition according to claim 1, wherein the reactive resin (A) has a hydroxyl content that is less than 1% by weight based on a total weight of the reactive resin (A).

4. The composition according to claim 1, wherein a alkenyl radical content of the alkenyl-functional siloxane resin is 0.6 to 2.2 eight percent of a total weight of the alkenyl-functional siloxane resin.

5. The composition according to claim 1, wherein the reactive resin (A) further comprises, as a part of its hydrosilylation reaction product, an endcapper according to a formula $R^3_3SiO-(R^3_2SiO)_s-SiR^3_2H$ or $R^4_3SiO-(R^4_2SiO)_t-(HR^4SiO)-SiR^4_3$, or combinations thereof, wherein each $R^3$ and $R^4$ is independently a hydrocarbon radical and wherein the subscripts s and t independently have values ranging from 0 to 10.

6. The composition according to claim 1, wherein the reactive resin (A) further comprises, as a part of its hydrosilylation reaction product, an alkenyltrialkoxysilane according to a formula $AlkSi(OR^5)_3$, wherein $R^5$ is a monovalent hydrocarbon having 1 to 6 carbon atoms, wherein Alk represents an alkenyl group having 2 to 6 carbon atoms, and wherein the alkenyl group is at the molecular terminal of the alkenyltrialkoxysilane of the reactive resin (A).

7. The composition according to claim 1, wherein the crosslinker (D) comprises a silane represented by monomers of a formula $R^{10}_{4-y}SiX_y$, or oligomeric reaction products thereof in which $R^{10}$ is selected from the group consisting of hydrocarbon radicals and substituted hydrocarbon radicals having 1-6 carbon atoms, X is a hydrolyzable group and the subscript y has a value of 2 to 4.

8. The composition according to claim 1, wherein a weight ratio of reactive resin (A) to reactive polymer (B) is from 40:60 to 80:20.

9. A method for forming a substrate assembly, the method comprising:
(1) providing the moisture-curable hot melt silicone adhesive composition according to claim 1;
(2) heating the moisture-curable hot melt silicone adhesive composition to a temperature sufficient to induce flow of the composition;
(3) disposing the heated composition onto a first substrate and a second substrate such that the moisture-curable hot melt silicone adhesive composition is located between the first substrate and the second substrate; and
(4) curing the moisture-curable hot melt silicone adhesive composition to bond the first substrate to the second substrate to form the substrate assembly.

10. A substrate assembly formed by the method according to claim 9.

11. A method for forming a moisture-curable hot melt adhesive composition, the method comprising:
(a) forming a reactive resin comprising a hydrosilylation reaction product of a reaction of:
an alkenyl-functional siloxane resin comprising $R_3SiO_{1/2}$ units and $SiO_{4/2}$ units, wherein each R is independently a monovalent hydrocarbon radical having 1 to 6 carbon atoms with the proviso that at least one R is an alkenyl radical, wherein the molar ratio of the $R_3SiO_{1/2}$ units to $SiO_{4/2}$ units has a value of from 0.5/1 to 1.5/1, and
a first alkoxysilane-functional organosiloxane compound of the formula $HSi(R^2)_2OSi(R^2)_2CH_2CH_2SiR^2_z(OR^2)_{3-z}$, wherein each $R^2$ is independently a monovalent hydrocarbon having 1 to 2 carbon atoms and wherein the subscript z is 0 or 1, in the presence of a first hydrosilylation catalyst;

(b) providing a (trimethoxysilylethyl)tetramethyldisiloxane-terminated polydimethylsiloxane having a viscosity of from 500 to 60,000 cps as a reactive polymer;

(c) mixing the reactive resin and the reactive polymer to form a first mixture;

(d) heating the first mixture to a temperature ranging from 140° C. to 180° C. and extruding the mixture through a first extruder to form an extruded mixture;

(e) cooling the extruded mixture to a temperature below 95° C. to provide a cooled extruded mixture;

(f) introducing and mixing a moisture cure catalyst and a crosslinker to the cooled extruded mixture to form a second mixture; and (g) extruding the second mixture through a second extruder to form a moisture-curable hot melt adhesive composition.

12. The method according to claim 11, wherein the reactive resin further comprises, as a part of its hydrosilylation reaction product, an endcapper according to the formula $R^3_3SiO—(R^3_2SiO)_s—SiR^3_2H$ or $R^4_3SiO—(R^4_2SiO)_t—(HR^4SiO)—SiR^4_3$, or combinations thereof, wherein each $R^3$ and $R^4$ is independently a hydrocarbon radical and wherein the subscripts s and t independently have values ranging from 0 to 10.

13. A moisture curable hot melt adhesive composition formed in accordance with the method according to claim 11.

* * * * *

UNITED STATES PATENT AND TRADEMARK OFFICE
CERTIFICATE OF CORRECTION

PATENT NO. : 10,370,572 B2
APPLICATION NO. : 14/766773
DATED : August 6, 2019
INVENTOR(S) : Thomas Bekemeier et al.

Page 1 of 1

It is certified that error appears in the above-identified patent and that said Letters Patent is hereby corrected as shown below:

In the Claims

Column 21, Claim 1, Line 43:
"z is 0 or 11"
Should read:
-- z is 0 or 1 --

Column 21, Claim 4, Line 58:
"eight percent"
Should read:
-- weight percent --

Signed and Sealed this
Third Day of December, 2019

Andrei Iancu
*Director of the United States Patent and Trademark Office*